No. 632,536. Patented Sept. 5, 1899.
E. B. PARKHURST.
BICYCLE PROPELLING MECHANISM.
(Application filed July 5, 1898.)
(No Model.) 2 Sheets—Sheet 1.
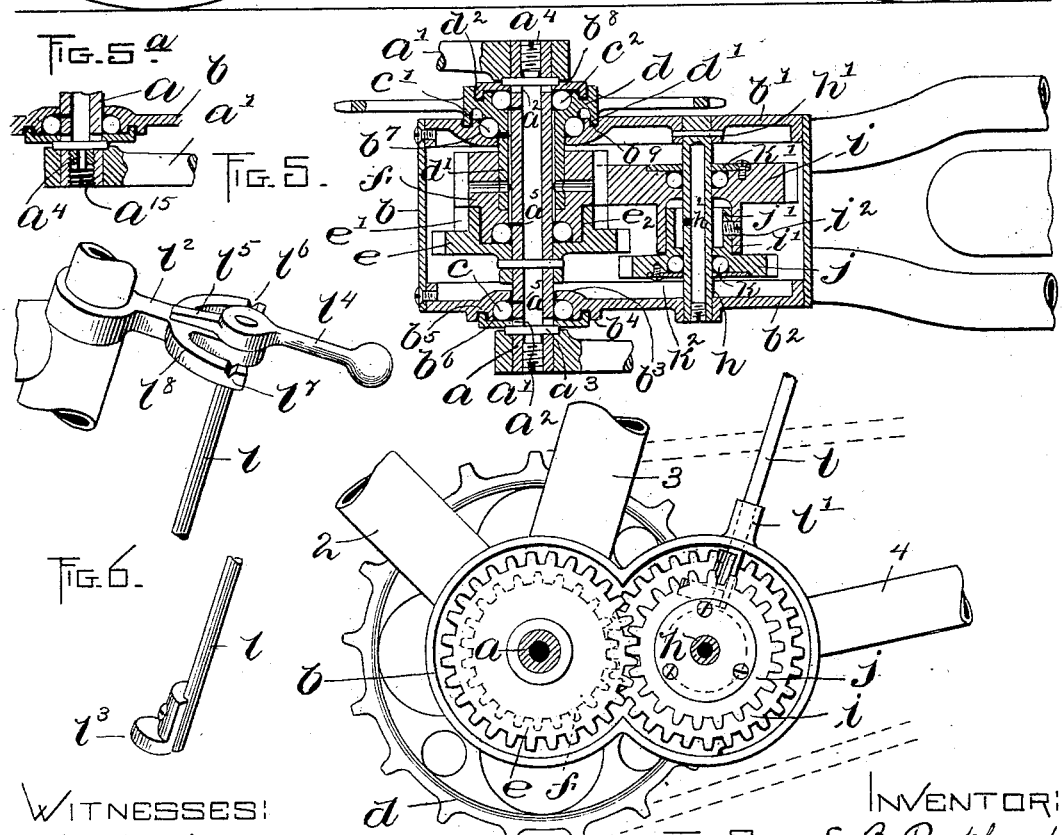

No. 632,536. Patented Sept. 5, 1899.
E. B. PARKHURST.
BICYCLE PROPELLING MECHANISM.
(Application filed July 5, 1898.)
(No Model.) 2 Sheets—Sheet 2.

WITNESSES:
A. D. Harrison.
H. L. Robbins.

INVENTOR:
E. B. Parkhurst
by Wright Brown & Quinby
Attys.

UNITED STATES PATENT OFFICE.

EDWARD B. PARKHURST, OF BOSTON, MASSACHUSETTS.

BICYCLE PROPELLING MECHANISM.

SPECIFICATION forming part of Letters Patent No. 632,536, dated September 5, 1899.

Application filed July 5, 1898. Serial No. 685,140. (No model.)

*To all whom it may concern:*

Be it known that I, EDWARD B. PARKHURST, of Boston, in the county of Suffolk and State of Massachusetts, have invented certain new and useful Improvements in Bicycle Propelling Mechanism, of which the following is a specification.

This invention relates to the propulsion of bicycles and other wheeled vehicles, and has for its object to provide certain improvements in the propelling mechanism of the same whereby the speed of the vehicle may be decreased and the power multiplied, and vice versa, and whereby the crank-shaft may be entirely disconnected from the transmitting devices, so that the rider may coast without the revolution of the cranks. In other words, the object of the invention is to provide an improved change-speed mechanism adapted for use on bicycles whereby the driving-wheel may be driven with a "high gear" on level roads and with a "low gear" when being propelled up a hill or incline.

To these ends the invention consists in certain improvements which I have illustrated upon the drawings and which I shall now proceed to describe in detail and finally point out in the claims hereunto appended.

Reference is to be had to the accompanying drawings, and to the letters and figures marked thereon, forming a part of this specification, the same letters and figures designating the same parts or features, as the case may be, wherever they occur.

Figure 3:
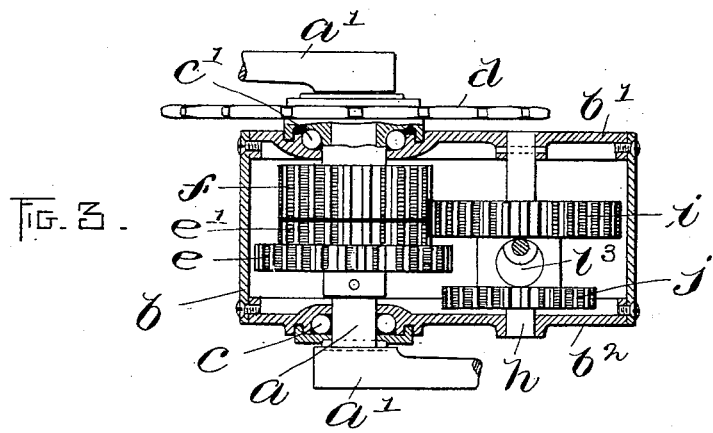
Figure 4:
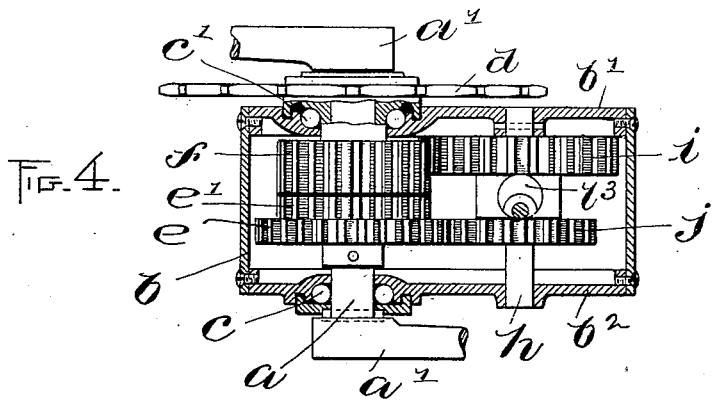
Figure 7:
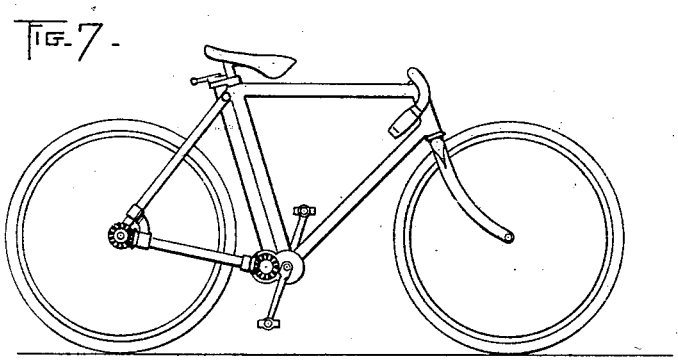
Figure 8:
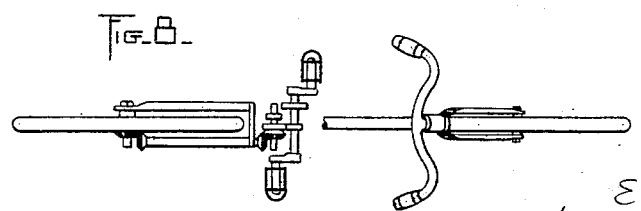

Of the drawings, Figure 1 represents in side elevation a bicycle equipped with my invention. Fig. 2 represents in side elevation the casing and the change-speed gearing therein, one end of the casing being removed. Fig. 3 represents a plan view, partly in section, of the change-speed devices. Fig. 4 represents the same with the movable clutching member in a different position. Fig. 5 represents a section on the line 5 5 of Fig. 1, the parts being greatly enlarged. Fig. 5ª represents a sectional detail hereinafter referred to. Fig. 6 shows in detail the mechanism for effecting the movement of the sliding clutch member. Figs. 7 and 8 illustrate the invention applied to a vehicle driven by bevel-wheels from the crank-shaft, such a bicycle being commonly known as "chainless."

It will be understood that though I describe some features of my invention in connection with a bicycle I do not desire to be understood as limiting their application thereto, as they may be employed in mechanisms of other kinds for accomplishing a variation of the speed of the driven member relatively to the speed of the driving member. At the same time, however, the invention possesses certain features which are especially applicable to bicycles, as I shall subsequently point out, and such features also form the subject-matter of some of the claims hereinafter presented.

Referring to the drawings, I have illustrated a bicycle which in Fig. 1 is portrayed as being provided with a sprocket-wheel and chain for imparting motion to the rear wheel and in Figs. 7 and 8 as being equipped with bevel-gearing for accomplishing the same purpose.

The crank-shaft $a$ is hollow and upon its ends are rigidly secured the cranks $a'$ $a'$. This shaft $a$ extends through a casing $b$, which in side elevation presents the appearance of two overlapping circles, as shown in Fig. 2. The casing or hanger $b$ is suitably connected by brazing or otherwise to the bars 2, 3, and 4 of the bicycle, and in it are placed all the parts of which the speed mechanism is composed. The ends of the casing are closed by plates $b'$ $b^2$, through which the shaft projects. The plate $b^2$ is formed with a socketed or concave portion $b^3$, surrounded by the annular ribs or flanges $b^4$, which form a groove $b^5$ to receive the flanged rim of a washer or plate $b^6$, between which and the concave portion $b^3$ are placed antifriction-balls $c$. The washer or ball-retainer $b^6$ is provided with a central aperture to receive the shaft $a$, and besides retaining the antifriction-balls in position it prevents the entrance of dust to the interior of the casing, the balls $c$ being inserted between the end plate $b^2$ and the shaft $a$ to permit the shaft to rotate without friction. Upon the opposite end of the shaft $a$ is loosely placed the sprocket $d$, which is formed with an inwardly-projecting hub $d'$, extending through the plate $b'$. The said plate $b'$ also has a cavity or concave portion $b^7$ similar to that at $b^3$, but greater in cross-diameter. Between the concave portion $b^7$ and the sprocket-wheel $b$ are placed antifriction-balls $c'$, and between the sprocket and the shaft $a$ are placed antifriction-balls $c^2$, held against displacement by a ball-retainer $b^8$, similar to that at $b^6$. It will be observed that the plate $b'$ is provided with a groove $b^9$, into which an annular flange $d^{10}$ of the sprocket-wheel projects and that the sprocket-wheel itself is provided with an annular groove $d^2$ to receive the flanged rim of the ball-retainer $d^3$.

Within the casing a large gear $e$ is rigidly secured to the shaft $a$, and it has a reduced toothed portion $e'$, equal in diameter to a smaller gear $f$, rigidly secured to the hub $d'$ of the sprocket-wheel and mounted loosely on the shaft $a$. The gear $f$ is provided with a reduced end portion which projects into a cavity or socket $e^2$ in the gear $e$ and is provided at its ends with a cup to receive antifriction-balls $c^3$, which are inserted between it and the shaft $a$ in the gear $e$.

As thus far described, it is apparent that the crank-shaft $a$ is mounted loosely in antifriction-bearings in the casing and that the sprocket-wheel and the gear $f$ are likewise mounted upon antifriction-bearings on the crank-shaft. The reduced portion $e'$ of the gear $e$ has the same number of teeth as the gear $f$, and they may be brought to register with those of the said gear $f$, as shown in Fig. 5.

Extending through the end plates $b'$ $b^2$ of the casing is another shaft $h$, which is secured in place by a pin $h'$. Upon this shaft are loosely mounted two gears of different size rigidly secured together. The larger gear $i$ is adapted to intermesh with either the gear $f$ or $e'$, or both, while the smaller gear is adapted to intermesh only with the gear $e$. They are provided with telescoping flanges $i'j'$, rigidly secured together by the screw $i^2$, and they are socketed to receive antifriction-balls $k$, interposed between them and the shaft $h$ and held against displacement by the retaining-plates $k'$ $k'$, secured to the gear by screws $k^2$ $k^2$.

When the gears are in the position shown in Fig. 5, the sprocket-wheel is disconnected from the shaft, and consequently the rider may keep his feet upon the pedals and "coast" without the cranks revolving. In Fig. 3 the gear-wheel $i$ is pictured as intermeshing with both the gear $f$ and the toothed portion $e'$ of the gear $e$, and it will thus be seen that it acts to connect the two last-mentioned portions, whereby the sprocket-wheel is driven rotation for rotation by the crank-shaft, or, in other words, the sprocket-wheel and the crank-shaft rotate at the same rate of speed. When, however, the gears $i$ $j$ are shifted to bring the gear $j$ into mesh with the gear $e$, power is imparted from the crank-shaft to the gear $f$ through the medium of gears $e$, $j$, and $i$, and therefore the sprocket-wheel is driven at a higher rate of speed than the crank-shaft.

In order to shift the gears $i$ and $j$, I employ a rock-shaft or rod $l$, mounted at one end in a boss $l'$ in the casing $b$ and at its other end in a bracket $l^2$, projecting out from the saddle-post. The lower end of this rod projects through the said casing and is provided with an arm $l^3$, extending between the gears $i$ and $j$, whereby when the rod is rocked the gears are shifted.

To accomplish the rocking of the rod, it is provided with a handle $l^4$ on its upper end, which has a finger $l^5$, adapted to drop in either one of two notches $l^6$ $l^7$ in segmental arms $l^8$, carried by the sprocket, and lock the gears $i$ $j$ against sliding movement. The handle $l^4$ is thus in a convenient position to be operated by the rider, who can do so without dismounting.

In order to adjust the shaft $a$ and the parts thereon, it is provided on its ends outside the ball-retainers $b^6$ $b^8$ with elongated slots $a^2$ to receive cross-pins $a^3$, which bear against the said ball-retainers, as shown in Fig. 5. The ends of the hollow shaft $a$ are internally threaded and screws $a^4$ are screwed thereinto until their ends bear against the cross-pins $a^3$. By adjusting the screws $a^4$ the shaft may be moved longitudinally, as will be readily understood. The shaft $h$ is not adjustable, there being no necessity for this, but it is closed by a screw $a^4$.

In order to provide a sufficient supply of lubricant, the hollow shafts are filled with it and are provided with ducts $a^5$ and $h^2$, whereby it is adapted to flow outward to the antifriction-balls, the gears, and the other moving parts.

In Fig $5^a$ one of the screws $a^4$ is shown as having a through-aperture, whereby lubricant can be injected through it into the crank-shaft without affecting the adjustment of the parts thereon. In this event the screw is comparatively short and a screw-cap $a^{15}$ is driven in after it to close the aperture therethrough.

The adjustment of the various parts on the crank-shaft is readily accomplished by turning one of the screws $a^3$, which causes the parts to approach toward or recede from each other.

The casing is practically dust-proof, since it is practically impossible for foreign matter to find its way between the ball-retainer and the sprocket and the sprocket and plate $b'$ on the one end and the ball-retainer and the plate $b^2$ on the other end, by reason of the parts having practically tongue-and-groove connections.

While I have described the gear-wheel $e$ as having "a reduced portion $e'$," it will be understood that I include thereby a gear, such as $e$, and a separately-formed small gear equal in diameter or number of teeth to the gear $f$ and rigidly secured either to the gear $e$ or to the shaft $a$.

The gear $i$ is continuously in engagement with the gear $f$, and it operates either as a clutch to connect the gears $f$ and $c'$ or else as a member of a train of gears for multiplying the speed of rotation.

I have contemplated the employment of mechanism for accomplishing three variations in speed of the toothed wheel—*i. e.*, the sprocket or bevel wheel—and consequently do not limit my invention to the exact number or construction of the parts shown.

Having thus explained the nature of the invention and described a way of constructing and using the same, though without attempting to set forth all of the forms in which it may be made or all of the modes of its use, I declare that what I claim is—

1. A change-speed device, comprising a driving-shaft, a second shaft parallel thereto, two gears on the driving-shaft which are different in diameter, two gears of different diameters on the said second shaft, the gears on one of said shafts being slidably mounted thereon and the construction being such that one of the gears on the second shaft may lock or clutch together the two gears on the driving-shaft by said sliding, and means for shifting the said slidably-mounted gears.

2. A change-speed device for bicycles, comprising a driving-shaft, a second shaft parallel thereto, two disconnected gears on the driving-shaft of which one is larger than the other and is provided with a reduced tooth portion equal in diameter to the other, connected gears slidably mounted on the other shaft, of which one gear is adapted to intermesh with the smaller of the first-mentioned gears alone or with it and with the reduced toothed portion of the larger gear, and the other is adapted to intermesh only with the larger of said gears, and mechanism for longitudinally sliding said connected gears.

3. Bicycle propelling mechanism, comprising a crank-shaft, a toothed wheel loose on said shaft, a small gear loose on said shaft and connected to the toothed wheel to turn therewith, a large gear rigidly secured on said shaft and having a reduced toothed portion equal in diameter to the small gear, a second shaft, two connected gears loosely mounted to slide on said shaft, one of said gears being adapted to engage the first-mentioned small gear alone or to engage it simultaneously with the reduced portion of the large gear, and the other of said gears being adapted to engage the large gear, and mechanism for shifting the said connected gears.

4. Bicycle propelling mechanism comprising a casing, a crank-shaft journaled in said casing, a supplemental shaft mounted in said casing, a toothed wheel loose on one of the shafts outside of the casing, a set of disconnected large and small gears on the last said shaft, one of said gears being connected to the toothed wheel and the other to the shaft, a set of connected large and small gears on the other shaft, and adapted to engage the first said gears, one of the gears on the supplemental shaft being arranged to either engage only one of the gears on the crank-shaft or to lock or clutch both of the crank-shaft gears together and mechanism for shifting the said connected gears to vary the speed of rotation of the said toothed wheel.

5. Bicycle propelling mechanism comprising a casing, a crank-shaft journaled in said casing, a supplemental shaft mounted in said casing, a toothed wheel loose on the crank-shaft outside the casing, a set of disconnected large and small gears on the crank-shaft, one of said gears being connected to the toothed wheel and the other being connected to the crank-shaft, loosely-sliding connected large and small gears on the supplemental shaft and adapted to intermesh with the first-mentioned gears, one of the gears on the supplemental shaft being arranged to either engage only one of the gears on the crank-shaft or to lock or clutch both of the crank-shaft gears together, and mechanism for sliding the said connected gears, for varying the speed of the said toothed wheel, or disconnecting it from the crank-shaft.

6. A bicycle propelling mechanism comprising a crank-shaft, a supplemental shaft, a toothed wheel on one of said shafts, a set of large and small toothed gears on each of said shafts, one of the gears of one set being continuously intermeshed with one of the gears of the other set, mechanism for shifting one set of said gears including one of the continuously-meshed pair, and means whereby the non-shifting gears on one of the shafts may be locked together or released from each other by shifting the movable set of gears on the other shaft.

7. Bicycle propelling mechanism comprising a shaft, a toothed wheel, antifriction devices between the toothed wheel and the shaft, a casing, antifriction devices between the shaft and the casing, and means for simultaneously adjusting all of said parts.

8. Bicycle propelling mechanism comprising a shaft, a toothed wheel loose on the shaft, a gear rigid on the shaft, antifriction devices between the toothed wheel, the shaft and the gear, a casing, antifriction devices between the casing and the shaft, and means for simultaneously effecting an adjustment of all of said parts.

In testimony whereof I have affixed my signature in presence of two witnesses.

EDWARD B. PARKHURST.

Witnesses:
   A. D. HARRISON,
   H. L. ROBBINS.